United States Patent
Nishimura et al.

(10) Patent No.: US 6,946,110 B2
(45) Date of Patent: Sep. 20, 2005

(54) CARBON FIBERS, PRODUCTION PROCESS THEREFOR AND ELECTRODE FOR BATTERIES

(75) Inventors: Kunio Nishimura, Yokohama (JP); Morinobu Endo, Suzaka (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 10/268,707

(22) Filed: Oct. 11, 2002

(65) Prior Publication Data

US 2003/0049443 A1 Mar. 13, 2003

Related U.S. Application Data

(62) Division of application No. 09/937,709, filed as application No. PCT/JP00/01835 on Mar. 24, 2000, now Pat. No. 6,489,026.
(60) Provisional application No. 60/145,266, filed on Jul. 26, 1999.

(30) Foreign Application Priority Data

Mar. 25, 1999 (JP) .............................. 11-81260
Oct. 29, 1999 (JP) .............................. 11-307867

(51) Int. Cl.[7] .................................. D01F 9/12
(52) U.S. Cl. ................ 423/447.1; 423/460; 423/445 R; 423/447.3
(58) Field of Search .............. 423/447.1, 447.2, 423/447.3, 445 R, 460

(56) References Cited

U.S. PATENT DOCUMENTS 5,698,341 A * 12/1997 Tamaki et al. ........... 429/231.8

6,103,373 A 8/2000 Nishimura

FOREIGN PATENT DOCUMENTS

| EP | 0136151 A1 * | 4/1985 |
| EP | 0424922 A2 | 5/1991 |
| EP | 0 762 522 A1 | 3/1997 |
| JP | 60-215816 A | 10/1985 |

(Continued)

OTHER PUBLICATIONS

Patent Abstracts of Japan, abstracting JP 10–255803 of Sep. 25, 1998.

Nishimura et al., "Anode Performance of B–doped Mesophase Pitch–based Carbon Fibers in Lithium Ion Secondary Batteries," TANSO, 1996, No. 172, pp. 89–94.

*Primary Examiner*—Stanley S. Silverman
*Assistant Examiner*—Peter J. Lish
(74) *Attorney, Agent, or Firm*—Sughrue Mion, PLLC

(57) ABSTRACT

Fine carbon fibers having a fiber diameter of 1 μm or less, an interlayer distance $d_{002}$ between carbon layers as determined by an X-ray diffraction method of 0.335 to 0.342 nm or less and satisfying $d_{002} < 0.3448 - 0.0028 (\log \phi)$ where φ stands for the diameter of the carbon fibers, and a thickness Lc of the crystal in the C axis direction of 40 nm or less. Fine carbon fibers containing boron in crystals of the fiber. The fine carbon fibers can be produced by using vapor-grown fine carbon fibers as a raw material; adding a boron or a boron compound to the material; pressing the mixture to regulate the bulk density to preferably 0.05 g/cm³ or more; and heating at a temperature of 2000° C. or higher.

5 Claims, 2 Drawing Sheets

DIAMETER OF CARBON FIBER (LOG. SCALE)

U.S. PATENT DOCUMENTS

Figure 1:
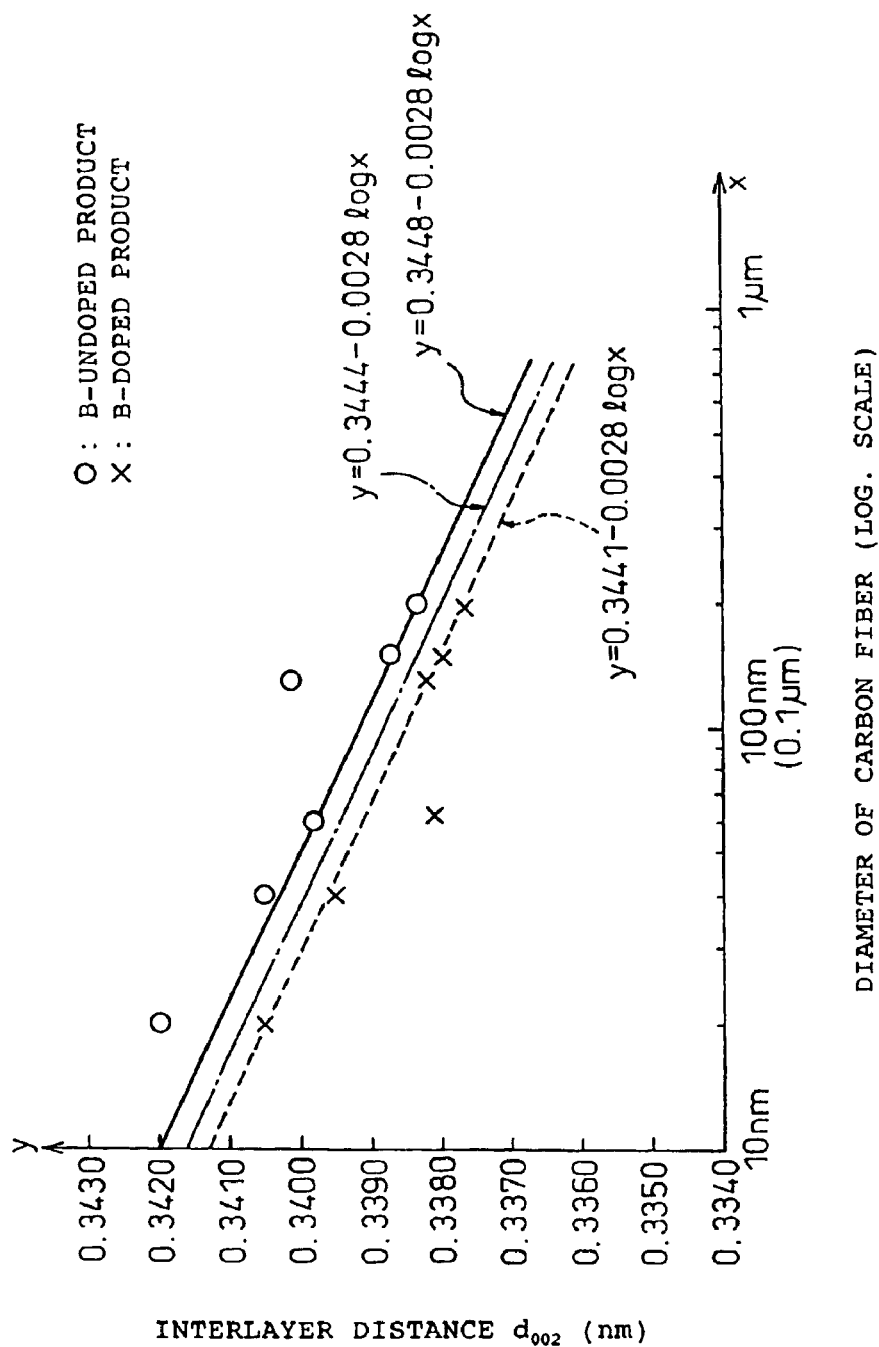

| | | | |
|---|---|---|---|
| JP | 61-70014 A | 4/1986 |
| JP | 63-282313 A | 11/1988 |
| JP | 02177261 | * | 7/1990 |
| JP | 3-146716 A | 6/1991 |
| JP | 3-61768 B2 | 9/1991 |
| JP | 3-245458 A | 11/1991 |
| JP | 5-44112 A | 2/1993 |
| JP | 5-36521 B2 | 5/1993 |
| JP | 5-251080 A | 9/1993 |
| JP | 5-266880 A | 10/1993 |
| JP | 5-321039 A | 12/1993 |
| JP | 06212517 | * | 8/1994 |
| JP | 7-73898 A | 3/1995 |
| JP | 7-150419 A | 6/1995 |
| JP | 8-31422 A | 2/1996 |
| JP | 8-306359 A | 11/1996 |
| JP | 9-63584 A | 3/1997 |
| JP | 9-63585 A | 3/1997 |
| JP | 5-221621 A | 3/1997 |
| JP | 10-255803 A | 9/1998 |

\* cited by examiner

CARBON FIBERS, PRODUCTION PROCESS THEREFOR AND ELECTRODE FOR BATTERIES

REFERENCE TO THE RELATED APPLICATION

This is a divisional of application Ser. No. 09/937,709 filed Sep. 21, 2001 now U.S. Pat. No. 6,489,026, which is a National Stage Entry of PCT/JP00/01835 filed Mar. 24, 2000, which claims benefit of Provisional Application No. 60/145,266 filed Jul. 26, 1999; the above noted prior applications are all hereby incorporated by reference.

TECHNICAL FIELD OF THE INVENTION

The present invention relates to fine carbon fibers (including coil-like carbon fibers, vapor grown carbon fibers, whisker carbon fibers, expanded carbon fibers and other fibrous carbons) and a process for producing the same, which carbon fibers are used as a filler added to any of a variety of materials such as metals, resins, and ceramics so as to improve electric and thermal conductivity thereof, as an electron-emitting element for an FED (field-emission display), and as a filler such as a property-improving material for a variety of batteries. The invention also relates to an electrode for batteries; i.e., a positive and a negative electrode for any of a variety of batteries such as a dry battery, a Pb secondary battery, a capacitor, and an Li ion secondary battery, the electrodes being incorporated with fine carbon fibers so as to improve the charge-discharge capacity and the mechanical strength of an electrode plate.

BACKGROUND OF THE INVENTION

Fine carbon fibers, as referred to in the present invention, are typically produced through a vapor phase method comprising thermal decomposition of hydrocarbon (e.g., disclosed in Japanese Patent Application Laid-Open (kokai) Nos. 7-150419, 5-321039, 60-215816, and 61-70014 and Japanese Examined Patent Publication (kokoku) Nos. 5-36521 and 3-61768). The thus-produced carbon fibers typically have a diameter of approximately 0.01–5 $\mu$m. If the diameter is 0.01 $\mu$m or more, the fine carbon fibers include carbon nano-tubes and carbon nano-fibers having a concentric or tree-annual-ring structure similar to the carbon fibers grown by the vapor phase method.

There has been proposed use of fine carbon fibers as a filler for metals, resins, ceramics, etc. Of these, fine carbon fibers are particularly proposed as a filler for batteries, because the development of portable apparatuses such as small-sized cellular phones, video cameras, and notebook-type personal computers has been remarkable, and the demand for a small-sized secondary battery including an Li ion secondary battery (Li battery) serving as a power source therefor has increased drastically.

Examples of typical carbonaceous materials for a negative electrode of an Li battery include hard carbon pitch, meso-phase carbon microbeads (MCMB), meso-phase pitch carbon fiber (MPCF), artificial graphite, coke, and naturally occurring graphite. Furthermore, the addition of carbon fibers produced from pitch or vapor-grown carbon fibers to these negative electrode materials has also been proposed, while carbonaceous materials such as graphite micropowder and carbon black are incorporated into a positive electrode as electric conductivity-providing agents.

In a negative electrode of an Li battery, intercalation and deintercalation of lithium ions occur during charge and discharge processes. Graphite, having a layered structure, easily undergoes intercalation wherein a reactant (e.g., Li) is inserted into an interlayer void to thereby expand the void (intercalation). The reaction product containing a compound inserted in the interlayer void is called a graphite intercalation compound. The intercalation compound easily releases the intercalated reactant (deintercalation), to thereby transform itself into graphite; i.e., the original material. Fine carbon fibers, which is a material having excellent electric and thermal conductivity and an intercalating property, do not lower the capacity of the battery, and thus addition thereof is of interest as an additive in a negative electrode material.

The enhancing of the intercalating property of the negative electrode is essential for enhancing the capacity of an Li battery. In general, in order to enhance the intercalating property, the degree of graphitization; i.e., crystallinity, of carbonaceous materials including fine carbon fibers must be enhanced.

A negative electrode of a lead secondary battery per se comprises a compound having poor electric conductivity, and carbonaceous materials such as carbon black, graphite microparticles and carbon fiber may optionally be added thereto to enhance the conductivity of the negative electrode. Such carbonaceous materials desirably have high electric conductivity and crystallinity. In order to enhance the crystallinity of such carbonaceous materials, the materials are typically treated at high temperature in order to effect graphitization.

Meanwhile, fine carbon fibers having a small average fiber diameter, particularly 1 $\mu$m or less, have a low bulk density and provide an insufficient filling density. Thus, when fine carbon fibers are added, to an electrode, in a large amount, the density of the electrode decreases. Therefore, fine carbon fibers are typically added in an amount of 20 mass % or less, preferably 10 mass % or less. From this point of view, fine carbon fibers are considered not to impart a remarkable effect commensurate with addition thereof even when the crystallinity of the fibers is enhanced. Therefore, no investigation other than treatment at high temperature has been carried out so as to enhance the crystallinity of fine carbon fibers. Thus, conventionally used fine carbon fibers have insufficient crystallinity, and the distance between two crystal layers represented by $d_{002}$ is larger than 0.3385 nm.

To meet with demand for increased capacity, electrode materials with a lower electric resistance are sought to give a large electric current charge-discharge capacity.

Addition of various conductivity-imparting materials are studied to lower the resistance of electrodes, in which it is known that a filler of a fibrous material particularly of vapor grown carbon fibers is effective. The reasons thereof include:

1) fine fibrous materials have an aspect ratio of 100 or more allowing a long conducting path;

2) vapor-grown carbon fibers have a high crystallinity to give a high conductivity; and 3) vapor-grown carbon fibers have a charge-discharge capacity to thereby prevent reducing the capacity of a Li battery when added.

However, commercially available fine fibrous materials having a diameter of 1 $\mu$m or less have an upper limit of the conductivity of 0.01 $\Omega \cdot$cm as the powder resistance when measured at a density of 0.8 g/cm$^3$ and there are no available fine fibrous materials having a conductivity higher than this.

Recently, the crystallinity of a negative electrode material has been enhanced to thereby improve the charge-discharge capacity of a battery. This trend forces an additive other than a negative electrode material to have a high discharge capacity. Therefore, the crystallinity of carbonaceous material serving as an additive for a negative electrode must be enhanced.

Considering the above requisite to enhance the crystallinity of fine carbon fibers, the inventors have been investigated heat treatment up to 3200° C. to enhance the crystallinity.

However, even when fine carbon fibers (vapor-grown carbon fibers) having diameters of the order of about 0.15 $\mu$m are heated to 3000° C. or higher, the lattice constant of the interlayer distance $d_{002}$ cannot be reduced to less than 0.3385 nm.

Simultaneously, the conductivity had an upper limit of 0.01 $\Omega$·cm as the powder resistance when measured at a density of 0.8 g/cm$^3$. Accordingly, fine carbon fibers having a higher crystallinity and a lower resistance are sought.

The supposed reason for the above failure is that vapor-grown carbon fibers have a considerably small fiber diameter and a unique structure wherein the core of the concentrically grown crystalline fiber comprises a hollow or amorphous portion. In addition, when the fiber diameter is as small as 1 $\mu$m or less, maintenance of a roll-shape structure of a carbon hexagonal network plane becomes more difficult with decreasing distance between the structure and the center of the fiber, to thereby make crystallization difficult. Therefore, the value of $d_{002}$ depends on the diameter of the fiber. For example, the limitations on the interlayer distance $d_{002}$ were 0.3385 nm for the fiber with a diameter of about 0.15 $\mu$m, 0.3400 nm for the fiber with a diameter of about 0.05 $\mu$m, 0.3415 nm for the fiber with a diameter of about 0.02 $\mu$m, and 0.3420 nm for the fiber with a diameter of about 0.01 $\mu$m or less. Therefore, the limitation of the interlayer space $d_{002}$ is 0.3385 nm and, even when the carbon fibers are heated to 3000° C. or higher, $d_{002}$ cannot be reduced to less than 0.3385 nm.

Accordingly, in order to enhance crystallinity and to reduce $d_{002}$ to 0.3385 nm or less, there must be developed a method for enhancing crystallinity other than heat treatment.

The object of the present invention is to develop fine carbon fibers having a high crystallinity that has not been produced through a conventional method or having a high crystallinity, and to provide a battery electrode having a higher performance by containing the developed carbon fibers as a filler.

SUMMARY OF THE INVENTION

Firstly, the present inventors have investigated a graphitization catalyst (Called also a graphitization aid or additive and hereinafter simply called a "graphitization catalyst" or "catalyst") so as to attain the above-described objects.

Before now, no investigations have been conducted on controlling the characteristics of fine carbon fibers having a fiber diameter of 1 $\mu$m or less by use of a graphitization catalyst. Further, the degree of enhancement in the crystallinity and characteristics of fine carbon fibers having such a particular crystal structure by use of a graphitization catalyst has not been elucidated.

Secondly, the present inventors have investigated treatment of fine carbon fibers by use of a catalyst.

The present invention has been accomplished based on the above study. The present invention provides the following.

(1) Fine carbon fibers having a diameter of 1 $\mu$m or less; an interlayer distance $d_{002}$ between carbon layers as determined by an X-ray diffraction method in a range of 0.335 nm to 0.342 nm, further 0.3354 nm to 0.3420 nm, and satisfying $d_{002} < 0.3448 - 0.0028$ (log $\phi$), preferably $d_{002} < 0.3444 - 0.0028$ (log $\phi$), more preferably $d_{002} < 0.3441 - 0.0028$ (log $\phi$), wherein $\phi$ stands for the diameter of the carbon fibers and the units of $d_{002}$ and $\phi$ are nm; and a thickness Lc of the crystal in the C axis direction of 40 nm or less.

(2) Fine carbon fibers according to (1), characterized in that the R value of Raman spectrum is 0.5 or more and the peak width of half height of a peak of the spectrum at 1580 cm$^{-1}$ is 20–40 cm$^{-1}$.

(3) Fine carbon fibers having a diameter of 1 $\mu$m or less and containing boron in the crystals of the fibers.

(4) Fine carbon fibers according to (1) or (2), which contain boron in the crystals of the carbon fibers.

(5) Fine carbon fibers according to (3) or (4), which contain boron in an amount of 0.1–3 mass %.

(6) Fine carbon fibers according to any one of (1) to (5), which have a fiber diameter of 0.01–1 $\mu$m and an aspect ratio of 10 or more.

(7) Fine carbon fibers according to (6), wherein the resistance as the powder when pressed to a density of 0.8 g/cm$^3$ is 0.01 $\Omega$·cm or less in the direction vertical to the pressing direction.

(8) Fine carbon fibers according to any one of (1) to (7), which are vapor-grown carbon fibers.

(9) A process for producing fine carbon fibers which comprises adding fine carbon fibers having a diameter of 1 $\mu$m or less with boron or a boron compound and heating the fine carbon fibers to 2000° C. or higher.

(10) A process for producing fine carbon fibers which comprises adding fine carbon fibers having a diameter of 1 $\mu$m or less with boron or a boron compound;

regulating bulk density of the fine carbon fiber to 0.05 g/cm$^3$ or more; and heating the fine carbon fiber to 2000° C. or higher while said density is maintained.

(11) A process for producing fine carbon fibers according to (9) or (10) wherein the amount of the added boron or boron compound is 0.1 to 10 mass %.

(12) A process for producing fine carbon fibers according to any one of (9) or (11) wherein the fine carbon fibers to which the boron or boron compound is added have a diameter of 0.01 to 1 $\mu$m and an aspect ratio of 10 or more.

(13) A process for producing fine carbon fibers according to any one of (9) or (12) wherein the fine carbon fibers to which the boron or boron compound is added are vapor-grown carbon fibers.

(14) A process for producing fine carbon fibers according to (13) wherein the fine carbon fibers, prior to said heat treatment, to which the boron or boron compound is to be added are fired products of vapor-grown carbon fibers fired after growth.

(15) A process for producing fine carbon fibers according to (13) wherein the fine carbon fibers, prior to said heat treatment, to which the boron or boron compound is to be added are unfired products of vapor-grown carbon fibers not fired after the growth.

(16) A battery electrode containing fine carbon fibers as recited in any one of (1) to (8).

BRIEF DESCRIPTIONS OF THE DRAWINGS

Figure 2:
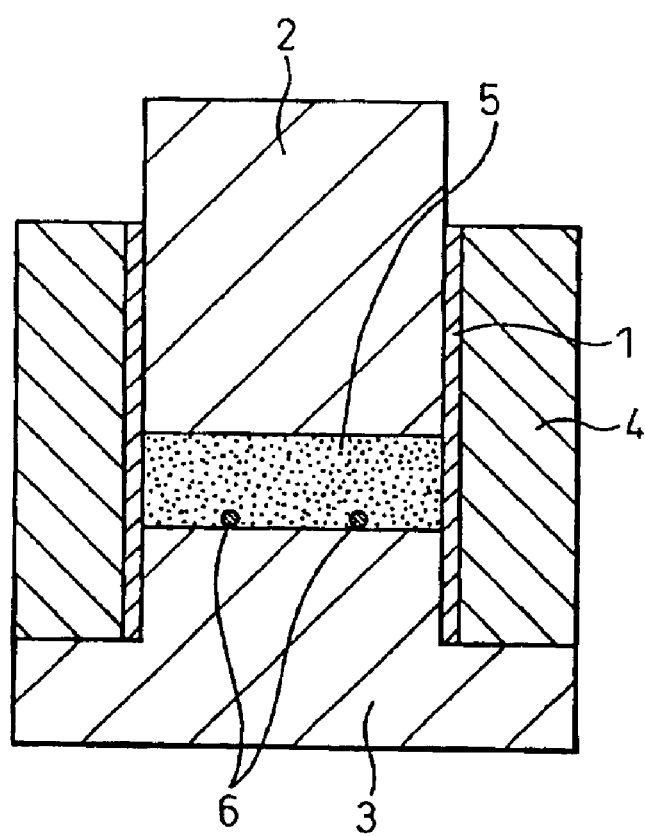

FIG. 1 is a graph showing the relationship between the fiber diameter of fine carbon fibers and the interlayer distance of the graphite crystal; and FIG. 2 is a cross section of an apparatus for measuring the resistance as the powder of the present invention.

BEST MODES FOR CARRYING OUT THE INVENTION

The fine carbon fibers of the present invention have excellent crystallinity, and the interlayer distance $d_{002}$ between carbon crystal layers as obtained through an X-ray diffraction method is 0.335–0.342 nm and the thickness Lc in the C axis direction of crystal is 40 nm or less, preferably 32 nm or less.

FIG. 1 is a graph showing the function of the interlayer distance $d_{002}$ as in relation to the fiber diameter for fine carbon fibers which have not been treated with boron and which have been treated with boron, which measurement was conducted by the inventors. The fine carbon fibers which have not been treated with boron have an interlayer distance $d_{002}$ greater than those represented by $d_{002}$= 0.3448–0.0028 (log $\phi$) where $\phi$ stands for the diameter of the carbon fiber, but the fine carbon fibers which have been treated with boron have the interlayer distance $d_{002}$ substantially smaller than those represented by the same formula. Therefore, the fine carbon fibers can be defined as having an interlayer distance $d_{002}$ as represented by $d_{002} < 0.3448 - 0.0028$ (log $\phi$), preferably $d_{002} < 0.3444 - 0.0028$ (log $\phi$), more preferably $d_{002} < 0.3441 - 0.0028$ (log $\phi$), where $\phi$ stands to the diameter of the carbon fibers.

In accordance with the study by the present inventors, the interlayer distance $d_{002}$ of carbon crystal could not be made smaller than $d_{002}$=0.3448–0.0028 (log $\phi$). Here, even if such small $d_{002}$ can be attained without boron treatment, such would be able to be attained only by conducting a special treatment or by attaining severe process conditions or the control thereof, the significance of the present invention, where fine carbon fibers having a small interlayer distance $d_{002}$ in the range of the present invention can be easily obtained by treating with boron, is not lost.

The fine carbon fibers of the present invention can be carbon fibers containing boron. The boron in the carbon fibers is present in the crystal of carbon (graphite), between the crystal layers, or in the crystal grain boundaries, or as impurity.

The fine carbon fibers of the present invention containing boron in crystals of the fibers are novel and therefore are not limited by the ranges of $d_{002}$ and Lc as above mentioned. The fibers preferably contain boron, and the $d_{002}$ and the Lc preferably fall within the above-described ranges.

Fine carbon fibers containing boron, and in which $d_{002}$ and Lc fall within the above-described ranges, can possess an R value of 0.5 or more, as obtained from a Raman spectrum (R=ID/IG, ratio of the absorption intensity ID at 1360 cm$^{-1}$ to the absorption intensity IG at 1580 cm$^{-1}$) and a narrow peak width at half height of peak at 1580 cm$^{-1}$ of the spectrum of 20 to 40 cm$^{-1}$.

The fine carbon fibers preferably have a fiber diameter of 0.01–1 μm, and, in view of the development of a function as fibers, an aspect ratio of 10 or more, more preferably 50 or more.

A fiber diameter of less than 0.01 μm induces poor mechanical strength when such fibers are used as a battery electrode or a filler for resin, a function as a fiber is easily lost; e.g., the fiber is easily cut. Meanwhile, for a given amount of addition as a filler (mass %), an increase in fiber diameter has an effect of reducing the number of fibers to be added. In this case, characteristics of fibers as a filler are insufficiently exhibited. When the fiber diameter is great, such carbon fibers do not easily enter into interparticle spaces of graphite particles contained as an electrode material in a battery negative electrode comprising carbon. When carbon fibers have a fiber diameter in excess of 1 μm, the productivity of the fibers per se decreases considerably, to thereby disadvantageously induce an increase in production cost. Thus, the fiber diameter is preferably 1 μm or less, more preferably 0.5 μm or less.

No particular limitation is imposed on the length of the carbon fibers, and the lower limit thereof is preferably determined from the lower limit of the aspect ratio (fiber length/fiber diameter). When the fiber length is excessively long, dispersibility when the fibers are used as a filler disadvantageously decreases due to entanglement of fibers. Thus, the upper limit of the fiber length is preferably 400 μm, more preferably 100 μm. For example, when the aspect ratio is 50 or more, a fiber diameter of 0.01 μm requires a fiber length of 0.5 μm or more, whereas a fiber diameter of 0.1 μm requires a fiber length of 5 μm or more. Also, the upper limit of the fiber length is preferably 400 μm, more preferably 100 μm.

The fine carbon fibers of the present invention having high crystallinity can be produced by heat treating fine carbon fibers in the presence of a boron compound. Although it is not intended to be bound by the theory, it is considered that, by such heat treatment, boron is incorporated into carbon fibers and the catalytic action of the incorporated boron gives the fine carbon fibers of the present invention high crystallinity The amount of boron in the fine carbon fibers effective in inducing a high degree of crystallization is generally in a range of 0.1–3 mass %, preferably 0.2–3 mass %. Boron is diffused through, for example, heating at high temperature, after completion of crystallization to a high degree. However, the boron content may become lower than the amount of boron added, so long as the fiber contains boron during crystallization.

The process for producing fine carbon fibers according to the present invention will next be described.

Carbon Fibers Serving as a Starting Material:

In the process according to the present invention, vapor-grown fine carbon fibers obtained through thermal decomposition of an organic compound such as benzene may be used as a starting material. For example, the starting material can be produced through methods disclosed in Japanese Patent Application Laid-Open (kokai) Nos. 7-150419, 5-321039, 60-215816, and 61-70014 and Japanese Examined Patent Publication (kokoku) Nos. 5-36521 and 3-61768. As long as the diameter is 0.01 μm or more, fine carbon fibers as carbon nano-tubes or carbon nano-fibers having a tree-annual-ring structure can be also used. Therefore, carbon nano-tubes, carbon nano-fibers or the like, having a multiple structure produced by arc discharge method, laser method, etc. can be also used.

The process for producing fine carbon fibers in a vapor growing method will be briefly described. A transition metal or a compound thereof, for example, a super fine powder of a metal such as iron, nickel or cobalt or super fine particles based on ferrocene is used as a seed; the seed super fine powder or super fine particles are formed on a substrate; a starting carbon material and optionally a carrier gas such as hydrogen are supplied thereto; the starting carbon material is decomposed at a high temperature; and fine fibers having a fiber diameter of 0.01 to 1 μm or more are grown with the super fine powder or super fine particles functioning as seeds. The method for forming a seed includes, on a substrate (the wall of a furnace may be used as a substrate), applying and drying a seed particle dispersion or a seed source solution, spraying ferrocene or the like, and forming fine particles of iron or a compound thereof by using ferrocene in a flowable state, and the seed may be formed on a surface of a substrate or may be formed in a flowing bed.

Moreover, because, on the surface of fine carbon fibers as grown by a vapor growing method as above, a large amount of tars and low boiling point components are simultaneously grown and fixed thereto and highly active iron fine particles are also present, the carbon fibers may be heated to treat the above substances.

However, the present inventors have found that the crystallinity of the fine carbon fibers increases insufficiently through heating. The inventors have investigated a catalyst (aid or additive) for attaining a high degree of crystallization. Examples of possible catalysts include B, Al, Be, and Si. Of these, boron (B) is particularly effective. Conventionally, there have been studied enhancement of crystallinity in typical carbonaceous materials through mixing with boron and heating (e.g., "TANSO" 1996, No. 172, p89–94; and Japanese Patent Application Laid-Open (kokai) Nos. 3-245458, 5-251080, 5-266880, 7-73898, 8-31422, 8-306359, 9-63584, and 9-63585).

However, no investigation has been conducted for improving a characteristic of vapor-grown fine carbon fibers having a fiber diameter of 1 $\mu$m or less through incorporation of boron. The reason is that since such fine carbon fibers have a unique structure the catalytic effect provided by boron in typical carbonaceous material has been considered unobtainable.

That is, vapor-grown carbon fibers have a cylindrical structure having a plurality of concentric layers, and a crystal structure is grown concentrically in a cross-section. The length of the fiber varies in accordance with production conditions. Since fibers having a small fiber diameter such as approximately 0.01–1 $\mu$m exists in the form of a single filaments or branched filaments, definite determination of the length is difficult. Through measurement of linear portions under a scanning electron microscope, most of the fiber filaments are found to have a fiber diameter of 5 $\mu$m or more. Since the fibers exist in the form of single long filaments or branched filaments, both long filaments and short filaments having a length of approximately 5 $\mu$m easily form a flock having a dimension of 10 $\mu$m or more, occasionally 100 $\mu$m or more. Thus, the fiber mass has a bulk density as small as 0.05 g/cm$^3$ or less, typically 0.01 g/cm$^3$ or less. In addition, a flock-like structure is formed.

Vapor grown carbon fibers having a unique structure different from usual carbon fibers are difficult to contact with a graphitization catalyst, to thereby possibly fail to attain a homogeneous introduction of boron.

In fine carbon fibers, as the diameter of the fibers becomes finer, particularly near the center, a carbon crystal layer tends to be bent, where it was thought unlikely that the fine carbon fibers are maintained when the crystallinity is enhanced by making the interlayer distance of the carbon crystal smaller. In other words, it was thought unlikely that the crystallinity of fine carbon fibers can be enhanced by boron.

However, the inventors, as a result of intensive efforts, have attained carbon fibers with a high cryatallinity by using boron as a catalyst (aid) in vapor grown fine carbon fibers.

In accordance with the present invention, in order to carry out doping with boron, there is used starting carbon fibers heat treated at low temperature, preferably at 1500° C. or lower, or more preferably as grown and not heat treated, which are not completely crystallized and are easily doped with boron. Even when starting fibers are not heat treated, the fibers are finally heated to the graphitization temperature during treatment with a catalyst comprising boron (boron-introducing treatment). Thus, starting fibers having a low crystallization degree can be used satisfactorily. Although carbon fibers graphitized at 2000° C. or higher, preferably 2300° C. or higher, may also be used, such graphitization is not necessary. Simultaneous graphitization and crystallization of carbon fibers not heat treated by use of a catalyst is preferred in view of energy conservation.

Fine carbon fibers serving as a starting material may be disintegrated or crushed in advance, to thereby facilitate handling in a subsequent step. The disintegration or crushing is sufficient if it is carried out to a degree such that mixing with boron or a boron compound is possible. In other words, before doping with boron the starting fibers are not necessarily processed so as to have a length suitable for a filler, since, after doping with boron, the starting fibers are finally subjected to treatment for preparing a filler, such as disintegration, crushing, or classification. Vapor-grown carbon fibers having a fiber diameter of approximately 0.01–1 $\mu$m and a length of approximately 0.5–400 $\mu$m may be used as such. The fibers may be flocculated. The starting fibers may also be subjected to heat treatment. In this case, the treatment is preferably carried out at 1500° C. or lower.

Boron or a Boron Compound:

Boron or a boron compound which is used in boron-introducing treatment suitably has the following properties, although it is not particularly limited. Since the treatment is carried out at 2000° C. or higher, there is used a substance which is not vaporized through thermal decomposition before the temperature is raised to at least 2000° C. Examples of the substance include elemental boron, $B_2O_3$, $H_3BO_4$, $B_4C$, BN and other boron compounds.

Typically, carbon can be doped with boron in an amount of 3 mass % or less. Thus, boron or a boron compound in a starting mixture may be in an amount of 10 mass % or less as reduced to boron atoms based on carbon atoms, in consideration of the doping ratio. When the amount is excessive, the cost for the treatment increases, and the additive is easily sintered or solidified, or covers the surface of the fibers, whereby characteristics of a filler may fall, e.g., electric resistance increases.

The fine carbon fibers (fiber diameter of 1 $\mu$m or less), having a 3-dimensional structure, are easily flocculated and have considerably low bulk density and high porosity. In addition, since boron is added in an amount as low as 10 mass % or less, preferably 5 mass % or less, attaining homogeneous contact between the fiber and boron species is difficult through simple mixing of the two components.

In order to effectively introduce boron, fibers and boron or a boron compound are sufficiently mixed, to thereby make contact as homogeneously as possible. In order to attain homogenous contact, boron or a boron compound employed must have as small a particle size as possible. When the particles are large, a domain containing high concentration of boron species is locally generated, to thereby possibly induce solidification. Specifically, the average particle size is 100 $\mu$m or less, preferably 50 $\mu$m or less, more preferably 20 $\mu$m or less.

A compound such as boric acid may be added in the form of an aqueous solution, and water may be vaporized in advance, or water may be vaporized during a heating step.

If the aqueous solution is mixed homogeneously, a boron compound can be homogeneously deposited on the surface of the fibers after removal of water through vaporization.

As described above, the vapor-grown fine carbon fibers have a small bulk density, and the as-produced mass has a bulk density of approximately 0.01 g/cm$^3$ or less. Even a product obtained through heat-treating or disintegrate-crush-classify treatment of the mass has a bulk density of approximately 0.02–0.08 g/cm$^3$. Such a low bulk density is,attributed to the fine carbon fibers being easily flocculated. Since the vapor-grown fine carbon fibers have high porosity, a considerably large-scale furnace is required for heat treatment, to thereby disadvantageously increase facility cost and lower productivity. Accordingly, a method for effectively introducing boron into a carbonaceous material other than a customary one must be developed.

In order to effectively carry out introduction of boron, contact between carbon and boron must be sufficiently maintained. The two components must be homogeneously mixed, to thereby attain sufficient contact therebetween. Furthermore, there must be prevented separation of the two components during heat treatment, which tends to cause unevenness in concentration.

Although the carbon fibers and boron or a boron compound may be mixed homogeneously and heated, the mixture is preferably treated so as to attain high density and is heated while the density is maintained (solidified) as long as possible. In a preferred mode of the present invention, two starting materials are mixed, and the mixture is compacted with pressure, to thereby solidify the mixture and increase density prior to heat treatment.

No particular limitation is imposed on the method for mixing carbon fibers and boron or a boron compound, so long as homogeneity is maintained. Although a variety of commercially available mixers may be used, a Henschel mixer having a chopper for disintegrating flocks is preferred as fine carbon fibers are easily flocculated. The starting fibers which are used may be as-produced fibers or fibers treated at 1500° C. or lower. Of these, as-produced fibers are preferred, in view of production cost.

There may be employed any of a variety of methods for solidifying a mixture of carbon fibers and boron or a boron compound so as to increase density and prevent separation of the two components. For example, there may be used shaping, granulating, or a method in which a mixture is compacted in a crucible into a certain shape. In the case in which the shaping method is used, the shaped mixture may assume any of columnar, plate-like, or rectangular parallelepiped form.

The above mixture which is solidified to have a high density has a bulk density of 0.05 g/cm$^3$ or more, preferably 0.06 g/cm$^3$ or more.

When the pressure for compacting the mixture is relieved after completion of shaping, the shaped mixture may be expanded, to thereby lower the bulk density. In consideration of such a case, the bulk density obtained during compacting is controlled such that the solidified mixture has a density of 0.05 g/cm$^3$ or more after pressure relief. When the carbon fibers are placed in a container, the fibers may be compacted for enhancing the treatment efficiency by use of a pressing plate or the like to thereby attain a bulk density of 0.05 g/cm$^3$ or more. The fibers may also be heated while it is being compacted.

The thus-treated fibers; i.e., a mixture of the fibers and boron or a boron compound and having an enhanced bulk density, is then heated.

In order to introduce boron into a crystal of carbon, the mixture must be heated at 2000° C. or higher, preferably 2300° C. or higher. When the temperature is less than 2000° C., reactivity between carbon and boron is poor, to thereby prevent introduction of boron. The temperature is preferably 2300° C. or higher so as to further accelerate introduction of boron, enhance the crystallinity of carbon, and, particularly, regulate $d_{002}$ to 0.3385 nm or less for a fiber having a diameter of about 0.15 µm. Although there is no upper limit of the temperature of heat treatment, the limit is approximately 3200° C. in accordance with restrictions imposed by an apparatus.

No particular limitation is imposed on the furnace used in heat treatment so long as the furnace can maintain a target temperature of 2000° C. or higher, preferably 2300° C. or higher. Examples of typically employed furnaces include an Acheson furnace, an electric resistance furnace, and a high-frequency furnace. Alternatively, a powder of a mixture or a shaped powder may be heated through direct application of electric current.

The atmosphere for heat treatment is a non-oxidizing atmosphere, preferably an inert gas such as argon. In view of productivity, the heating time is preferably as short as possible. Particularly, heating for a long period of time promotes sintering, to thereby lower the yield. Therefore, after the temperature of a core portion of the shaped mixture has reached the target temperature, further maintenance at the temperature for one hour or less is sufficient.

Through the heat treatment, the carbon fibers of the present invention first attain a $d_{002}$ of 0.3420 nm or less and enhanced crystallinity. However, Lc (a thickness of the layers in the direction of the C axis of a carbon crystal as determined by the X-ray diffraction method) still remains 40 nm or less, more preferably 32 nm or less, which is equal to that of similarly heat-treated B-free carbon fibers. Generally, in graphitizing carbonaceous material, Lc typically increases as $d_{002}$ decreases. In the carbon fibers having a diameter of about 0.2 µm of present invention, Lc does not increase, but remains at 40 nm or less, which is equal to that of similarly heat-treated B-free carbon fibers. In other words, the fibers of the present invention are characterized by $d_{002}$ decreasing but Lc not changing drastically.

Also, as usual vapor growing fibers are heated, the peak at 1580 cm$^{-1}$ of Raman spectrum increases and the peak at 1360 cm$^{-1}$ decreases, i.e., the R value decreases, finally to about 0.1 to about 0.2 as graphitizing, but in a boron treated product of the present invention, the R value was 0.5 or more, about 0.7 to about 0.8.

Moreover, as the peak at 1580 cm$^{-1}$ became higher, the half maximum full width narrowed to 20 to 40 cm$^{-1}$.

Along with decrease in $d_{002}$ and increase in the height of peak at 1580 cm$^{-1}$, the electric conductivity increased to 0.01 Ω·cm or less, specifically 0.003 Ω·cm.

When shaped fibers having a high density obtained through press molding or the like are heated, the fibers are partially sintered to thereby form a block. The heat-treated fibers as such cannot serve as a filler added to an electrode or as an electron-emitting material. Thus, the shaped fiber must be disintegrated into a form suitable for a filler.

In order to do this, when the block is disintegrated, crushed, and classified into a material suitable for a filler, non-fibrous matter is separated simultaneously. Excessive crushing lowers performance of a filler, whereas insufficient crushing results in poor mixing with an electrode material, to thereby lose the effect of a filler.

In order to produce a filler having a suitable shape, the block formed after heat treatment is disintegrated to attain a dimension of 2 mm or less, and is further crushed by use of a crusher. Examples of a disintegrating apparatus which may be employed include an ice-crusher and a Rote-plax. Examples of a crusher which may be employed include a pulverizer (impact type), a free crusher, and a Microjet. Non-fibrous matter can be separated through classification, such as gas-flow classification. The conditions for crushing and classification vary in accordance with the type of the crusher and operational conditions. In order to fully realize a characteristic of a filler, the fibers preferably have a length of 5–400 µm and an aspect ratio of 10 or more, more preferably 50 or more.

When the conditions are represented by bulk density after crushing and classification, bulk density 0.001 g/cm$^3$–0.2 g/cm$^3$, preferably 0.005 g/cm$^3$–0.15 g/cm$^3$, more preferably 0.01 g/cm$^3$–0.1 g/cm$^3$. When the bulk density is in excess of 0.2 g/cm$^3$, the length of the fibers is as short as 5 µm or less, depending on the fiber diameter, to thereby provide a poor filler effect; whereas when the bulk density is less than 0.001 g/cm$^3$, the length of the fibers is as long as more than 400 µm, depending on the fiber diameter, to thereby lower filling density of the filler. The bulk density referred to herein represents tapping bulk density obtained from the volume and weight of fibers which are placed in a container and vibrated until the volume reaches an almost constant value.

The fine carbon fibers of the present invention are added to a battery electrode, to thereby enhance performance of the battery. The fibers enhance electric conductivity of an electrode plate of batteries such as a lithium battery, a lead secondary battery, a polymer battery, and a dry battery, or the performance of a battery requiring an intercalating property. In addition to an effect of enhancing conductivity of these batteries, the fine carbon fibers of the present invention, having excellent crystallinity and conductivity, are added to a lithium battery to thereby enhance the charge-discharge capacity thereof, since the fibers exhibit a great intercalating property as a carbonaceous material for a negative electrode. Particularly, a carbon fiber in which $d_{002}$ is 0.3420 nm or less and Lc is 40 nm or less provides the above effects to a considerable degree. Even in the case of boron-containing carbon fibers in which $d_{002}$ and Lc fall outside the above ranges, crystallinity and conductivity are more excellent than in the case of boron-free fine carbon fibers. Thus, the fibers are also adaptable to the above use.

The fine carbon fibers are preferably added to an electrode in an amount of 0.1–20 mass %. Amounts in excess of 20 mass % have an effect of decreasing the filling density of carbon in the electrode to thereby lower the charge-discharge capacity of the produced battery; whereas amounts less than 0.1 mass % provide a poor effect of addition.

In order to produce a battery through the addition of the fine carbon fibers, a material for a negative electrode, the fibers, and a binder are sufficiently kneaded to thereby disperse the fibers as homogeneously as possible. Examples of a material for a negative electrode of a lithium battery include graphite powder and meso-phase carbon microbeads MCMB).

EXAMPLES

The present invention will next be described in more detail by way of examples, and effects of the carbon fibers of the present invention as a filler for an electrode will be elucidated.

Enhancement of the Crystallization Degree of Fine Carbon Fibers:

Example 1

Carbon fibers obtained through a known method (e.g., a method disclosed in Japanese Patent Application Laid-Open (kokai) No. 7-150419) in which benzene is thermally decomposed in the presence of an organic compound containing a transition metal was used as a raw material, which was subjected to a heat treatment at 1200° C. The resultant flocculated fibers were disintegrated, to thereby produce carbon fibers having a bulk density of 0.02 g/cm$^3$ and a fiber length of 10–100 µm. Most of the fiber filaments had a fiber diameter of 0.5 µm or less (average fiber diameter obtained through observation by use of an SEM image is 0.1 to 0.2 µm). X-ray diffraction analysis revealed that the fibers had an interlayer distance between crystal layers represented by $d_{002}$ of 0.3407 nm and Lc of 5.6 nm.

The thus-produced fibers (2.88 kg) and B$_4$C powder (average particle size of 15 µm, 120 g) were sufficiently mixed by use of a Henschel mixer. The mixture was fed in a 50-L pipe-shaped graphite crucible and pressed by use of a pressurizing plate made of graphite, to thereby adjust the bulk density to 0.075 g/cm$^3$. The mixture was subjected to a heat treatment at 2900° C. in an Acheson furnace while the mixture was pressed by the pressuring plate which simultaneously served as a cap in the crucible. Heating continued for 60 minutes after the temperature reached 2900° C.

After completion of heat treatment, the fibers were cooled, removed from the crucible, roughly disintegrated and then crushed by use of a bantam mill. Non-fibrous matter was separated through gas-flow classification.

Although the fiber diameter of the resultant fibers did not change, the fibers had a length of 5–30 µm and a bulk density of 0.04 g/cm$^3$. The boron content and $d_{002}$ and Lc as determined by the X-ray diffraction method are shown in Table 1. The above heat treatment at 2900° C. was repeated except that B$_4$C was not added to carbon fibers. The results of measurement of the above fibers are shown in Table 1 (the data indicated by Comp. Ex. 1).

Example 2

Carbon fibers obtained in a similar manner as described in Example 1 was disintegrated and crushed, to thereby produce carbon fibers having a bulk density of 0.05 g/cm$^3$. Most of the fiber filaments had a fiber length of 10–50 µm and a fiber diameter of average fiber diameter of 0.06 µm obtained through observation by use of an SEM image. The thus-produced fibers (150 g) and B$_4$C powder (average particle size of 10 µm, 6 g) were sufficiently mixed by use of a Henschel mixer. The mixture was fed in a cylindrical molding apparatus and pressed, to thereby obtain a column formed of carbon fiber having a diameter of 150 mm and a bulk density of 0.087 g/cm$^3$.

The shaped fibers were heated at 2800° C. under an argon flow for 60 minutes in a graphite furnace having a heating medium made of graphite.

After completion of heat treatment, the fibers were removed from the furnace, simply disintegrated to a dimension of 2 mm or less by use of a mortar, crushed by use of a bantam mill, and subjected to gas-flow classification. The obtained B-doped fibers had a bulk density of 0.046 g/cm$^3$. Most of the fiber filaments had a length of 5–20 µm.

The boron content and $d_{002}$ and Lc as determined by the X-ray diffraction method are shown in Table 1. The above heat treatment at 2800° C. was repeated except that B$_4$C was not added to the carbon fibers. The results of measurement of the above fibers are shown in Table 1 (the data indicated by Comp. Ex. 2).

Example 3

Fine carbon fibers used as a raw material were obtained through the same known method disclosed in Japanese Patent Application Laid-Open (kokai) No. 7-150419 in which benzene is thermally decomposed in the presence of an organic compound containing a transition metal. The carbon fibers, which were not subjected to a heat treatment, were disintegrated to a bulk density of 0.01 g/cm³. Most of the fiber filaments had a fiber diameter of 0.13 μm or less. The thus-produced fibers (200g) and $B_4C$ powder (average particle size of 19 μm, 8 g) were sufficiently mixed by use of a Henschel mixer. The mixture was fed in a shaping machine and pressed to form a cylinder having a diameter of 150 mm. The bulk density after the shaping was 0.07 g/cm³.

The shaped body was placed in a graphite furnace with a graphite heater and was subjected to a heat treatment at 2800° C. for 60 minutes.

After the heating, the shaped body was removed, disintegrated to a diameter of 2 mm or less by use of a mortar and then crushed by use of a bantam mill. Non-fibrous matter was separated through gas-flow classification. The doped product had a bulk density of 0.03 g/cm³.

The boron content and $d_{002}$ and Lc as determined by the X-ray diffraction method are shown in Table 1. The above heat treatment at 2800° C. was repeated except that $B_4C$ was not added to carbon fibers. The results of measurement of the above fibers are shown in Table 1 (the data indicated by Comp. Ex. 3).

TABLE 1

|  | Boron content (mass %) | $d_{002}$ (nm) | Lc (nm) |
|---|---|---|---|
| Example 1 | 1.03 | 0.3380 | 29.0 |
| Comp. Ex. 1 | — | 0.3387 | 31.8 |
| Example 2 | 1.10 | 0.3381 | 25.0 |
| Comp. Ex. 2 | — | 0.3398 | 26.9 |
| Example 3 | 1.57 | 0.3382 | 31.1 |
| Comp. Ex. 3 | — | 0.3401 | 21.7 |
| Example 4 | 1.02 | 0.3395 | 25.4 |
| Comp. Ex. 4 | — | 0.3405 | 21.6 |
| Example 5 | 0.93 | 0.3376 | 29.9 |
| Comp. Ex. 5 | — | 0.3383 | 30.5 |

Example 4

Carbon fibers obtained in the same manner as in Example 1 were disintegrated and then crushed to have a bulk density of 0.02 g/cm³. Most of fiber filaments had a length of 10–50 μm and an average diameter of about 0.04 μm. 3000 g of the fibers was added with 120 g of $B_4C$ having an average particle size of 15 μm and the mixture was sufficiently mixed by use of a Henschel mixer. The mixture (88 g) was packed in a graphite crucible having an inner diameter of 100 mm and an inner 20 length of 150 mm. The bulk density of the packed mixture was 0.08 g/cm³.

The crucible with a cover was placed in a carbon resistance furnace and heated in an argon flow at 2800° C. for 60 minutes.

After completion of the heat treatment, the shaped body was removed from the furnace and simply dissociated to a dimension of 2 mm or less by use of a mortar. It was then crushed in a bantam mill and classified by a gas flow and the obtained boron-doped product had a bulk density of 0.04 g/cm³. The boron analysis revealed that 1.02 % of boron was incorporated in the crystals of the fibers. In Table 1, the found or measured values of $d_{002}$ and Lc are shown ($d_{002}$=0.3395 nm and Lc=25.4 nm). The values of $d_{002}$ and Lc for carbon fiber which was treated in the same process except that $B_4C$ was not added are shown as Comparative Example 4 in Table 1 ($d_{002}$=0.3405 nm and Lc=21.6 nm).

The powder resistance of the fibers was measured. The measuring method was developed by the inventors and is as follows.

As shown in FIG. 2, a measuring cell comprises a cell 4 having a requtangular of 10 mm×50 mm and a depth of 100 mm, a compressing rod 2 and a receiver 3. A certain amount of powder is put in the cell and the compressing rod 2 is pressed downward to compress the powder.

While the pressure and volume are measured, a current, 100 mA, is passed from an electrode 1 set in the direction normal to the pressing direction and a voltage (E, V) for a 10 mm distance is read by use of two measuring terminals 6 extending from the receiver, and the resistance (R, Ωcm) is calculated from the following formula.

$$R=E/100 \; (\Omega cm)$$

The powder resistance depends on the density and the evaluation should be made between values measured at the same density. In this case, the resistances measured at a powder density of 0.8 g/cm³ are compared.

The results are shown in Table 2.

The measured $d_{002}$ of the product was 0.3395 nm and Lc was 5.4 nm.

For reference, the resistance of a product produced in the same manner, but $B_4C$ was not added, is shown as Comparative Example 9 in Table 2.

Example 5

Vapor grown carbon fibers produced in the same manner as in Example 1 but having a diameter of 0.2 μm larger than that of Example 4 were heat-treated at 1300° C. and dissociated to a bulk density of 0.05 g/cc. The fibers (150 g) and $B_4C$ (6 g) having an average particle size of 10 μm were put and mixed in a Hencshel mixer. The powder was shaped to a round column with a size of 150ϕ×100 mm by use of a cylinder with an inner diameter and a length of 150ϕ×400 mm and a pressing device. The bulk density of the body was 0.030 g/cm³, but it was pressed in the cylinder to have a compressed bulk density of 0.08 g/cm³.

The shaped body was placed in a graphite furnace with a graphite heater and heated in an argon atmosphere with a temperature elevation rate of 15° C./min. The heating temperature was 2800° C.

After the heat treatment, the fibers were removed from the furnace and lightly dissociated to a dimension of 4 mm or less by use of a mortar. They were crushed in a bantam mill and classified to have a bulk density of 0.03 g/cm³. A boron analysis revealed that boron was incorporated in the crystals of fibers in an amount of 0.93%.

The powder resistance of the obtained fiber is shown in Table 2.

The $d_{002}$ of Example 5 is simultaneously shown, which is lowered as that of Example 4. Lc was 29.9 nm. For reference, $d_{002}$ and Lc of a product produced in the same manner but $B_4C$ was not added are shown as Comparative Example 5 in Table 1.

TABLE 2

|  | Powder resistance (Ω · cm) | $d_{002}$ (nm) |
|---|---|---|
| Com. Ex. 9 (B not added) | 0.013 | 0.3388 |
| Fibers of Example 4 | 0.003 | 0.3395 |
| Fibers of Example 5 | 0.002 | 0.3376 |

Confirmation of Effect of Filler:

Example 6

In order to study if the powder resistance of a negative electrode is really lowered when the fibers of the invention are added to the electrode, the fibers of Example 4 were added to commercially available graphite particles (average particle size of 10 μm) and the relationship between the added amount and the powder resistance was determined. Also the relationship between the added amount and the powder resistance when the fibers of Comparative Example 3, in which boron was not added, were used, was determined.

The resistances for the cases when the fibers were not added and was added in an amount of 3%, 5% and 10% are shown in Table 3. The method for measuring the powder resistance was the same as in Example 4, but the bulk density of the fibers was made to 1.5 g/cm³ since they are preferably compared when the bulk density was set at the same density as that of electrode.

Application of the above fibers to an electrode of a lithium battery will next be described in an Example.

Example 7

An electrode was produced from the fibers alone (100%), and the effect of the fiber of the present invention was first investigated.

To each of the carbon fibers produced in Examples 1 to 3 and Comparative Examples 1 to 3, PVDF (poly(vinylidene fluoride)) was added in an amount of 3 mass %. Each mixture was pressed onto nickel mesh, to thereby fabricate a working electrode (negative electrode). The battery performance was measured by use of Li metal as a counter electrode. LiPF$_6$ (1 mol) was dissolved in a mixture of ethylene carbonate (EC) and diethyl carbonate (DEC) (volume ratio 1:1), to thereby prepare an electrolyte for the battery. The current density during evaluation of the battery was 0.2 mA/g.

The measured discharge capacity of each battery is shown in Table 4.

Electrodes to which the carbon fibers were added will be described in an Example.

Example 8

Pitch coke was subjected to a heat treatment at 3000° C. to thereby form graphite particles having an average particle size of 16 μm (G1), which was a carbonaceous material serving as a negative electrode material of a battery. Graphite particles incorporated with boron during heat treatment (GB) and B-free graphite particles (G1) were used. GB contained boron in an amount of 0.98 mass %.

PVDF (3 mass %) was added to each of GB, G1, and combinations of GB or G1 to which carbon fibers produced in Example 1 or Comparative Example 1 were added in an amount of 5 mass %, to thereby prepare a slurry, which was then pressed onto nickel mesh to thereby produce an electrode plate. The electrolyte, counter electrode, and current density employed in this Example are the same as those employed in the previous Example. The measurements of the discharge capacity of each battery are shown in Table 4. In Reference Examples 1 and 2, electrodes were constituted exclusively by GB and G1, respectively. The calculated discharge capacity in Table 4 was obtained through summation of 0.95-fold discharge capacity of G1 or GB and 0.05-fold discharge capacity of carbon fibers.

TABLE 3

| Fiber addition | Powder resistance (Ω · cm) | |
|---|---|---|
| (%) | Fibers with no B | Fibers added with B |
| 0 | 0.06 | — |
| 3 | 0.05 | 0.01 |
| 5 | 0.035 | 0.007 |
| 10 | 0.025 | 0.004 |

TABLE 4

| | Electrode material | Discharge capacity (mAh/g) (found) | Discharge capacity (mAh/g) (calculated) | Difference (found)- (calculated) |
|---|---|---|---|---|
| Example 7-(1) | Fibers of Ex. 1 | 311 | | |
| Comp. Ex. 7-(1) | Fibers of Comp. Ex. 1 | 275 | | |
| Example 7-(2) | Fibers of Ex. 2 | 305 | | |
| Comp. Ex. 7-(2) | Fibers of Comp. Ex. 2 | 272 | | |
| Example 7-(3) | Fibers of Ex. 3 | 308 | | |
| Comp. Ex. 7-(3) | Fibers of Comp. Ex. 3 | 269 | | |
| Ref. Ex. 1 (B-added) | GB | 319 | | |
| Ref. Ex. 2 | G1 | 280 | | |
| Example 8-(1) | GB + fibers of Ex. 1 (5 mass %) | 332 | 319 | 13 |
| Comp. Ex. 8-(1) | GB + fibers of Comp. Ex. 1 (5 mass %) | 321 | 317 | 4 |
| Example 8-(2) | G1 + fibers of Ex. 1 (5 mass %) | 292 | 282 | 10 |
| Comp. Ex. 8-(2) | G1 + fibers of Comp. Ex. 1 (5 mass %) | 282 | 280 | 2 |

As is clear from Table 4, when fine carbon fibers were added to a carbonaceous material serving as a negative electrode material, a lithium battery having an electrode (negative electrode) formed of the above electrode material exhibited a discharge capacity higher than that of the value calculated from the discharge capacity of an electrode material and that of carbon fibers. Particularly, boron-incorporated fine carbon fibers, to which boron was incorporated and treated at high temperature to enhance crystallinity, exhibited the above effect. In other words, addition of boron-containing fine carbon fibers to a carbonaceous material serving as a negative electrode material definitely provides a synergistic effect, although the reason therefor has not been elucidated. The effect is remarkably high when high-crystallinity fine carbon fiber is added.

INDUSTRIAL APPLICABILITY

The present invention provides fine carbon fibers, having a higher level of crystallinity which has not conventionally been realized, and fine carbon fibers containing boron. High-crystallinity imparts excellent electric conductivity and thermal conductivity to carbon fibers. Thus, such carbon fibers are excellent material serving as fillers for resin, ceramics, or metal.

Particularly, the carbon fibers have a high dispersion efficiency due to small diameter thereof even in a small amount of addition is added as a filler for an electrode of a battery. Since the fine carbon fibers of the present invention can permit intercalation of significant amounts of lithium ions, the fibers are able to enhance the discharge capacity of a battery even with a small amount of addition.

What is claimed is:

1. A process for producing fine carbon fibers comprising:
    adding vapor-grown fine carbon fibers having a diameter of 1 $\mu$m or less to boron or a boron compound;
    compacting the mixture of fine carbon fibers and boron or a boron compound to obtain a solidified shaped mixture;
    relieving pressure after completion of shaping;
    regulating the bulk density of the mixture of fine carbon fibers and boron or a boron compound during compacting such that the solidified mixture has a bulk density of 0.05 g/cm$^3$ or more after pressure relief; and
    heat treating said fine carbon fibers to a temperature of 2000° C. or higher while said bulk density is maintained, to produce fine carbon fibers having an interlayer distance d002 between carbon layers as determined by an X-ray diffraction method of 0.335 to 0.342 nm, and satisfying d002<0.3448−0.0028 (blog $\phi$) where $\phi$ represents the diameter the carbon fibers and the units of d002 are nm, and a thickness Lc of the crystal in the C axis direction of 40 nm or less.

2. A process for producing fine carbon fibers according to claim 1, wherein the amount of the boron or boron compound is 0.1–10 mass % in terms of boron atoms with respect to the carbon fibers.

3. A process for producing fine carbon fibers according to claim 2, wherein the fine carbon fibers to which the boron is mixed have a diameter of 0.01 to 1 m and an aspect ratio of 10 or more.

4. A process for producing fine carbon fibers according to claim 3, wherein the fine carbon fibers prior to said heat treatment to which the boron or boron compound is to be added are a fired product of vapor-grown carbon fibers fired after growth.

5. A process for producing fine carbon fibers in according to claim 3, wherein the fine carbon fibers prior to said heat treatment to which the boron or boron compound is to be added are unfired product of vapor-grown carbon fibers not fired after growth.

* * * * *